(12) United States Patent
Mittendorf et al.

(10) Patent No.: US 9,085,980 B2
(45) Date of Patent: Jul. 21, 2015

(54) METHODS FOR REPAIRING TURBINE COMPONENTS

(75) Inventors: Don Mittendorf, Mesa, AZ (US);
Daniel Ryan, Phoenix, AZ (US);
Donald G. Godfrey, Phoenix, AZ (US);
Mark C. Morris, Phoenix, AZ (US);
Harry Kington, Mesa, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 104 days.

(21) Appl. No.: 13/041,113

(22) Filed: Mar. 4, 2011

(65) Prior Publication Data

US 2012/0222306 A1  Sep. 6, 2012

(51) Int. Cl.
| F01D 5/00 | (2006.01) |
| F01D 5/20 | (2006.01) |
| B22F 3/105 | (2006.01) |
| B23P 6/00 | (2006.01) |
| B22F 7/06 | (2006.01) |

(52) U.S. Cl.
CPC .............. *F01D 5/005* (2013.01); *B22F 3/1055* (2013.01); *B23P 6/007* (2013.01); *F01D 5/20* (2013.01); *B22F 2003/1057* (2013.01); *B22F 2007/068* (2013.01); *F05D 2230/31* (2013.01); *F05D 2240/304* (2013.01); *F05D 2240/307* (2013.01); *Y02T 50/67* (2013.01); *Y02T 50/673* (2013.01); *Y10T 29/49318* (2015.01)

(58) Field of Classification Search
CPC ..... Y10T 29/49318; F01D 5/005; F01D 5/20; B23P 6/007
USPC ............... 29/402.01, 402.05, 402.08, 402.09, 29/402.11, 402.13, 407.01, 889.1, 889.7; 427/556, 173
See application file for complete search history.

(56) References Cited

U.S. PATENT DOCUMENTS

| 4,145,481 | A | 3/1979 | Gupta et al. |
| 4,198,442 | A | 4/1980 | Gupta et al. |
| 4,382,976 | A | 5/1983 | Restall |
| RE31,339 | E | 8/1983 | Dardi et al. |
| 4,499,048 | A | 2/1985 | Hanejko |
| 4,687,678 | A | 8/1987 | Lindblom |
| 4,818,562 | A | 4/1989 | Arcella et al. |
| 5,096,518 | A | 3/1992 | Fujikawa et al. |

(Continued)

FOREIGN PATENT DOCUMENTS

| DE | 2104062 A1 | 8/1972 |
| DE | 102008056336 A1 | 5/2010 |

(Continued)

OTHER PUBLICATIONS

Ryan et al.; Methods for Manufacturing Turbine Components, filed with the USPTO on Jun. 22, 2010 and assigned U.S. Appl. No. 12/820,652.

(Continued)

*Primary Examiner* — David Bryant
*Assistant Examiner* — Lee A Holly
(74) *Attorney, Agent, or Firm* — Ingrassia Fisher & Lorenz, P.C.

(57) ABSTRACT

A method is provided for repairing a turbine component with a distressed portion. The method includes machining the turbine component into a first intermediate turbine article such that the distressed portion is removed; and rebuilding the first intermediate turbine article into the turbine component with an additive manufacturing process.

12 Claims, 11 Drawing Sheets

(56) References Cited

U.S. PATENT DOCUMENTS

| | | | |
|---|---|---|---|
| 5,106,266 | A | 4/1992 | Borns et al. |
| 5,128,179 | A | 7/1992 | Baldi |
| 5,236,116 | A | 8/1993 | Solanki et al. |
| 5,249,785 | A * | 10/1993 | Nelson et al. .................. 269/21 |
| 5,465,780 | A | 11/1995 | Muntner et al. |
| 5,514,482 | A | 5/1996 | Strangman |
| 5,634,992 | A | 6/1997 | Kelly et al. |
| 5,640,667 | A | 6/1997 | Freitag et al. |
| 5,650,235 | A | 7/1997 | McMordie et al. |
| 5,745,834 | A | 4/1998 | Bampton et al. |
| 5,837,960 | A | 11/1998 | Lewis et al. |
| 5,947,179 | A | 9/1999 | Kinane et al. |
| 6,049,978 | A | 4/2000 | Arnold |
| 6,154,959 | A | 12/2000 | Goodwater et al. |
| 6,172,327 | B1 | 1/2001 | Aleshin et al. |
| 6,174,448 | B1 | 1/2001 | Das et al. |
| 6,269,540 | B1 * | 8/2001 | Islam et al. .................. 29/889.7 |
| 6,270,914 | B1 | 8/2001 | Ogasawara et al. |
| 6,355,116 | B1 | 3/2002 | Chen et al. |
| 6,447,924 | B1 | 9/2002 | Bettridge |
| 6,485,848 | B1 | 11/2002 | Wang et al. |
| 6,504,127 | B1 | 1/2003 | McGregor et al. |
| 6,568,077 | B1 * | 5/2003 | Hellemann et al. .......... 29/889.1 |
| 6,575,349 | B2 | 6/2003 | Van Esch |
| 6,676,892 | B2 * | 1/2004 | Das et al. .......................... 419/7 |
| 6,758,914 | B2 | 7/2004 | Kool et al. |
| 6,838,191 | B1 | 1/2005 | Raj |
| 6,884,461 | B2 | 4/2005 | Ackerman et al. |
| 6,969,457 | B2 | 11/2005 | MacDonald et al. |
| 7,216,428 | B2 | 5/2007 | Memmen et al. |
| 7,270,764 | B2 | 9/2007 | Wustman et al. |
| 7,651,658 | B2 | 1/2010 | Aimone et al. |
| 7,794,800 | B2 | 9/2010 | Clark et al. |
| 7,829,142 | B2 | 11/2010 | Kool et al. |
| 2001/0014403 | A1 | 8/2001 | Brown et al. |
| 2003/0037436 | A1 * | 2/2003 | Ducotey et al. .............. 29/889.1 |
| 2003/0088980 | A1 | 5/2003 | Arnold |
| 2003/0217915 | A1 | 11/2003 | Ouellet et al. |
| 2004/0009635 | A1 | 1/2004 | Nakasato et al. |
| 2005/0036892 | A1 | 2/2005 | Bajan |
| 2005/0091848 | A1 * | 5/2005 | Nenov et al. .................. 29/889.1 |
| 2005/0133527 | A1 | 6/2005 | Dullea et al. |
| 2006/0013820 | A1 | 1/2006 | Bonnet et al. |
| 2006/0177582 | A1 | 8/2006 | Chandra et al. |
| 2006/0222776 | A1 | 10/2006 | Madhava et al. |
| 2007/0000772 | A1 | 1/2007 | Ramm et al. |
| 2007/0084047 | A1 * | 4/2007 | Lange et al. .................. 29/889.1 |
| 2007/0107202 | A1 | 5/2007 | Das |
| 2008/0014457 | A1 | 1/2008 | Gennaro et al. |
| 2008/0290215 | A1 | 11/2008 | Udall et al. |
| 2008/0304975 | A1 | 12/2008 | Clark et al. |
| 2009/0081066 | A1 | 3/2009 | Illston |
| 2009/0200275 | A1 | 8/2009 | Twelves et al. |
| 2009/0255602 | A1 | 10/2009 | McMasters et al. |
| 2010/0021289 | A1 * | 1/2010 | Grylls et al. .................. 415/177 |
| 2010/0025001 | A1 | 2/2010 | Lee et al. |
| 2010/0028158 | A1 * | 2/2010 | Richter .................... 416/223 R |
| 2010/0065142 | A1 | 3/2010 | McMasters et al. |
| 2010/0200189 | A1 | 8/2010 | Qi et al. |
| 2010/0221567 | A1 | 9/2010 | Budinger et al. |
| 2011/0106290 | A1 | 5/2011 | Hövel et al. |
| 2011/0135952 | A1 | 6/2011 | Morris et al. |
| 2011/0311389 | A1 | 12/2011 | Ryan et al. |
| 2012/0034101 | A1 | 2/2012 | James et al. |

FOREIGN PATENT DOCUMENTS

| | | | |
|---|---|---|---|
| EP | 0861919 | A2 | 9/1998 |
| GB | 2279667 | A | 1/1995 |
| JP | 5104259 | A | 4/1993 |
| WO | 97/19776 | A1 | 6/1997 |
| WO | 2008034413 | A1 | 3/2008 |
| WO | 2008046387 | A1 | 4/2008 |

OTHER PUBLICATIONS

Hussain et al.; Advanced Nanocomposites for High Temperature Aero-Engine/Turbine Components, Inderscience Publishers, International Journal of Nanomanufacturing; vol. 4, No. 1-4, 2009, pp. 248-256. Retrieved from Internet: <URL:www.inderscience.com>.

Mainier et al.; On the Effect of the Electroless Nickel-Phosphorus Coating Defects on the Performance of This Type of Coating in Oilfieled Environments, OnePetro, SPE Advanced Technology Series; vol. 2, No. 1, Mar. 1994.

Bi et al.; Feasibility Study on the Laser Aided Additive Manufacturing of Die Inserts for Liquid Forging, ScienceDirect.

Groth et al.; New Innovations in Diode Laser Cladding, Fraunhofer USA—Center for Surface and Laser Processing.

Clark et al.; Shaped Metal Deposition of a Nickel Alloy for Aero Engine Applications, SciencetDirect.

Electroless Nickel, New Hampshire Materials Laboratory, Inc.

EP Search Report for Application No. 12 184 142.3 dated Feb. 6, 2013.

Godfrey, D. G., et al.: "Multi-Material Turbine Components" filed with the USPTO on Jan. 27, 2012 and assigned U.S. Appl. No. 13/360,126.

Szuromi, et al.; Methods for Manufacturing Components from Articles Formed by Additive-Manufacturing Processes, filed with the USPTO on Sep. 16, 2011 and assigned U.S. Appl. No. 13/235,210.

Ryan, et al.; Methods for Manufacturing Turbine Components, filed with the USPTO on Jun. 22, 2010 and assigned U.S. Appl. No. 12/820,652.

Loeber, L., et al.; Comparison of Selective Laser and Electron Beam Melted Titanium Aluminides, published Sep. 24, 2011, pp. 547-556.

Godfrey, D. G. et al.: Titanium Aluminide Components and Methods for Manufacturing the Same from Articles Formed by Consolidation Processes, Filed with the USPTO on Aug. 1, 2012 and assigned U.S. Appl. No. 13/564,656.

USPTO Notice of Allowance Notification Date Jan. 26, 2015 for U.S. Appl. No. 13/564,656.

Friel, R.J., et al., "Ultrasonic additive manufacturing—A hybrid production process for novel functional products". Procedia CIRP 6 (2013) 35-40.

Gu. D.D., et al., "Laser additive manufacturing of metallic components: materials, processes and mechanisms". International Materials Reviews 2012, vol. 57, No. 3 pp. 133-164.

USPTO Office Action, Notification Date Sep. 17, 2014; U.S. Appl. No. 13,564,656.

Kothari, K, et al., "Microstructure and mechanical properties of consolidated gamma titanium aluminides". Powder Metallurgy, 2007, vol. 50, No. 1, pp. 21-27.

Wang, G.-X., et al., "TiAl-based high temperature materials made from extremely deformed elemental powders". Journal de Physique IV, Colloque C7, supplement au Journal de Physique III, vol. 3, Nov. 1993, pp. 469-472.

USPTO Office Action; Notification Date Dec. 22, 2014 for U.S. Appl. No. 13/360,126.

EP Search Report for Application No. 12157966.8 dated Mar. 17, 2015.

USPTO Office Action Notification Date Mar. 27, 2015 for U.S. Appl. No. 12/820,652.

EP Examination Report for Application No. 12157966.8 dated Apr. 28, 2015.

* cited by examiner

METHODS FOR REPAIRING TURBINE COMPONENTS

TECHNICAL FIELD

The present invention generally relates to turbine engines, and more particularly relates to methods for repairing turbine components for engines.

BACKGROUND

Gas turbine engines are generally known in the art and used in a wide range of applications, such as propulsion engines and auxiliary power unit engines for aircraft. In a typical configuration, a turbine section of the engine includes turbine components such as rows of stator vanes and rotor blades disposed in an alternating sequence along the axial length of a generally annular hot gas flow path. The rotor blades are mounted on the periphery of rotor disks coupled to a main engine shaft. The stator vanes are coupled to inner and outer endwalls and optimally direct hot combustion gases to the rotor blades, thus resulting in rotary driving of the rotor disks to provide an engine output.

The stator vanes and rotor blades typically have arcuate shapes with generally concave pressure sides and generally convex suction sides extending axially in chords between opposite leading and trailing edges. During operation, the aerodynamic contours of the stator vanes and rotor blades, and corresponding flow passages therebetween, are configured in an attempt to maximize energy extraction from the combustion gases. Since higher engine efficiencies may occur at higher temperatures, some turbine components may additionally include internal cooling passages to enable such high temperature operation.

Given these considerations, turbine components may have relatively complex three-dimensional (3D) geometries that may raise difficult fabrication and repair issues. With respect to repair issues, the turbine components may be subject to oxidation and thermo-mechanical fatigue. Conventionally, it may not be technically feasible to repair compromised components and replacement is necessary, thereby increasing down-time and costs. Some repair techniques, such as welding, have been attempted, but have not been completely satisfactory, particularly in turbine components with complex internal structures such as cooling passages.

Accordingly, it is desirable to provide improved repair methods for turbine components that enable improved cycle times and reduced costs without sacrificing component performance or durability. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for repairing a turbine component with a distressed portion. The method includes machining the turbine component into a first intermediate turbine article such that the distressed portion is removed; and rebuilding the first intermediate turbine article into the turbine component with an additive manufacturing process.

In accordance with an exemplary embodiment, a method is provided for repairing at least one turbine component. The method includes positioning a first turbine component of the at least one turbine component in a bed of powdered metal, the first turbine component having a first set of dimensions; depositing a layer of the powdered metal onto the first turbine component; selectively melting the layer of powdered metal onto the first turbine component with a laser; and successively performing the depositing and selectively melting step until the first turbine component has a second set of dimensions.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include methods for repairing turbine components of gas turbine engines. The turbine component is initially cleaned and machined to known dimensions. The turbine component is then repaired with an additive manufacturing technique such as direct metal laser fusion. Further processing steps, such as machining, encapsulation, consolidation and other finishing techniques, may be used to produce a finished turbine component.

Figure 1:
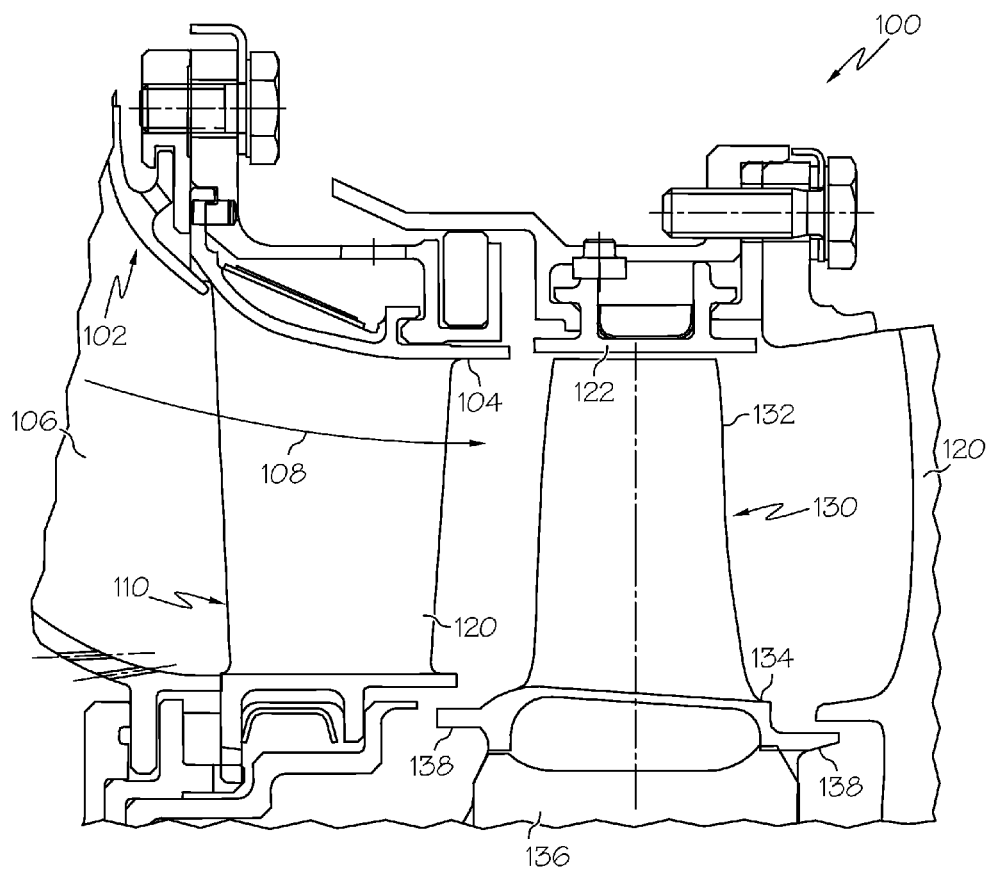
FIG. 1 is a partial cross-sectional view of a turbine section of a gas turbine engine assembly in accordance with an exemplary embodiment.

FIG. 1 is a partial cross-sectional view of a turbine section 100 of a gas turbine engine assembly in accordance with an exemplary embodiment. The turbine section 100 and gas turbine engine assembly have an overall construction and operation that is generally understood by persons skilled in the art. In general terms, the turbine section 100 has a housing 102 with an annular duct wall 104 that defines a mainstream hot gas flow path 106 for receiving a flow of mainstream combustion gases 108 from an engine combustor (not shown). The housing 102 additionally houses at least one stator assembly 110 with stator vanes 120 and at least one turbine rotor assembly 130 with turbine rotor blades (or airfoils) 132. The rotor blades 132 of the turbine rotor assembly 130 project radially outward toward a shroud flange 122 from a turbine rotor platform 134 that is coupled to a turbine disk 136, which in turn circumscribes a shaft (not shown). The rotor platform 134 may include one or more flow discouragers 138 that assist in maintaining efficient air flow along the mainstream hot gas flow path 106.

During operation, the combustion gases 108 flow past axially spaced circumferential rows of stator vanes 120 and rotor blades 132 to drive the rotor blades 132 and the associated turbine rotor assembly 130 for power extraction. Other embodiments may be different configurations.

Figure 2:
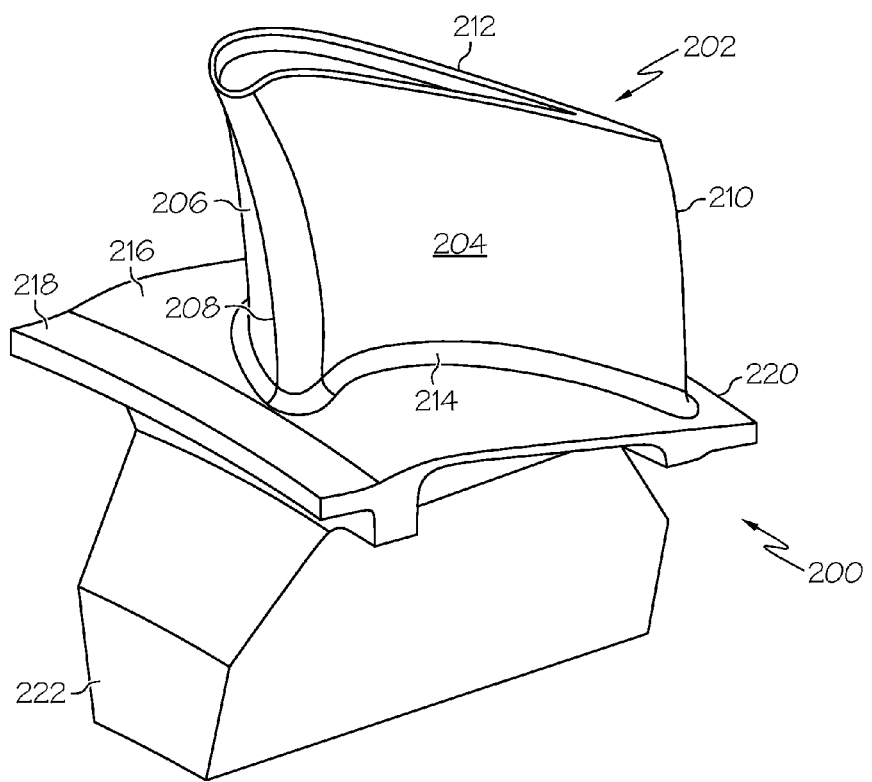
FIG. 2 is an isometric view of a turbine component in accordance with an exemplary embodiment.

FIG. 2 is an isometric view of a turbine component 200 in accordance with an exemplary embodiment and generally illustrates the relatively complex 3D geometric configuration typical of a turbine component, for example, that may be incorporated into the turbine section 100 of FIG. 1. Although the turbine component 200 in FIG. 2 is depicted as a rotor blade, such as rotor blade 132 (FIG. 1), the exemplary embodiments discussed herein are applicable to any type of turbine component, including stator vanes, such as stator vanes 120 (FIG. 1), turbine shrouds, such as turbine shroud 122 (FIG. 1), and other types of engine components.

The turbine component 200 may include an airfoil 202 with a generally concave pressure side 204 and a generally convex suction side 206 opposed thereto and joined at a leading edge 208 and a trailing edge 210. In a radial direction, the airfoil 202 extends from a tip 212 to a root 214, which is coupled to a platform 216 that defines an inner boundary for the hot combustion gases that pass over airfoil 202 during engine operation. The platform 216 may further include flow discouragers 218 and 220 that function to discourage hot gas ingestion into undesired areas. A mounting dovetail 222 may be integrally formed on the underside of the platform 216 for mounting the turbine component 200 within the turbine section 100 (FIG. 1). In this exemplary embodiment and as discussed below, the turbine component 200 may include internal passages or hollow areas to provide a cooling flow during engine operation, although in further embodiments, the turbine component 200 may be solid.

Figure 3:
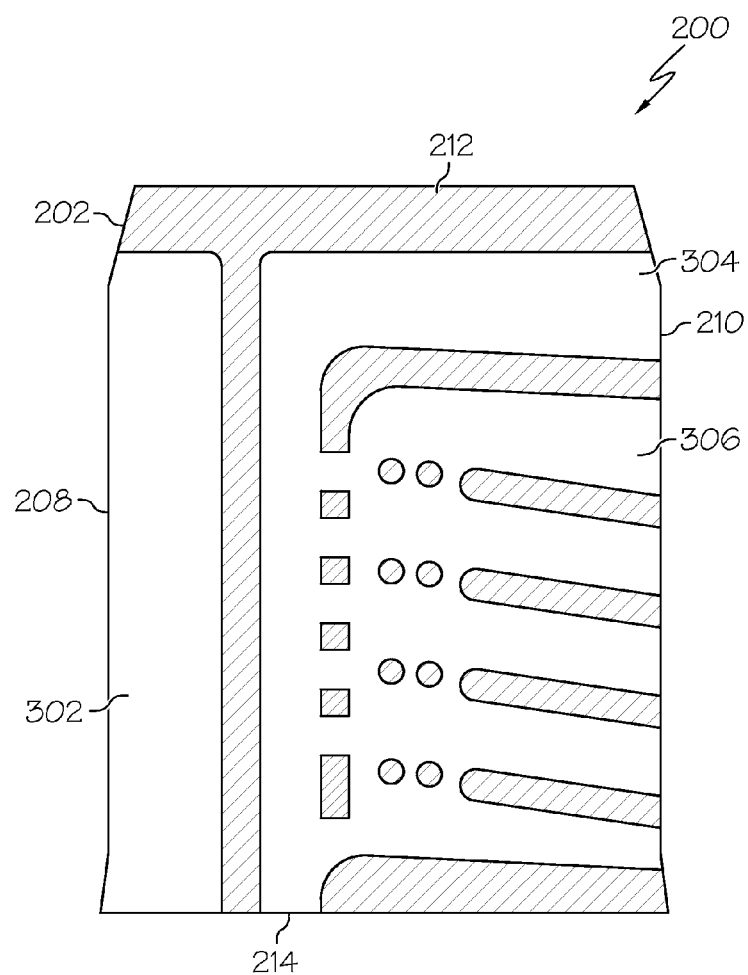
FIG. 3 is a first partial cross-sectional view of the turbine component of FIG. 2 in accordance with an exemplary embodiment.

FIG. 3 is a first partial cross-sectional view of the turbine component 200 of FIG. 2 in accordance with an exemplary embodiment. Particularly, FIG. 3 illustrates a generally radial cross-sectional view of the airfoil 202 of FIG. 2. As previously noted, the airfoil 202 extends from the leading edge 208 to the trailing edge 210 and from the tip 212 to the root 214.

The airfoil 202 defines a number of cooling passages 302, 304, and 306. For example, a forward cooling circuit 302 delivers cooling air to the leading edge 208 and tip 212. A tip cooling circuit 304 delivers cooling air to the tip 212, particularly the tip 212 at the trailing edge 210. A trailing edge cooling circuit 306 delivers cooling air to the trailing edge 210.

Figure 4:
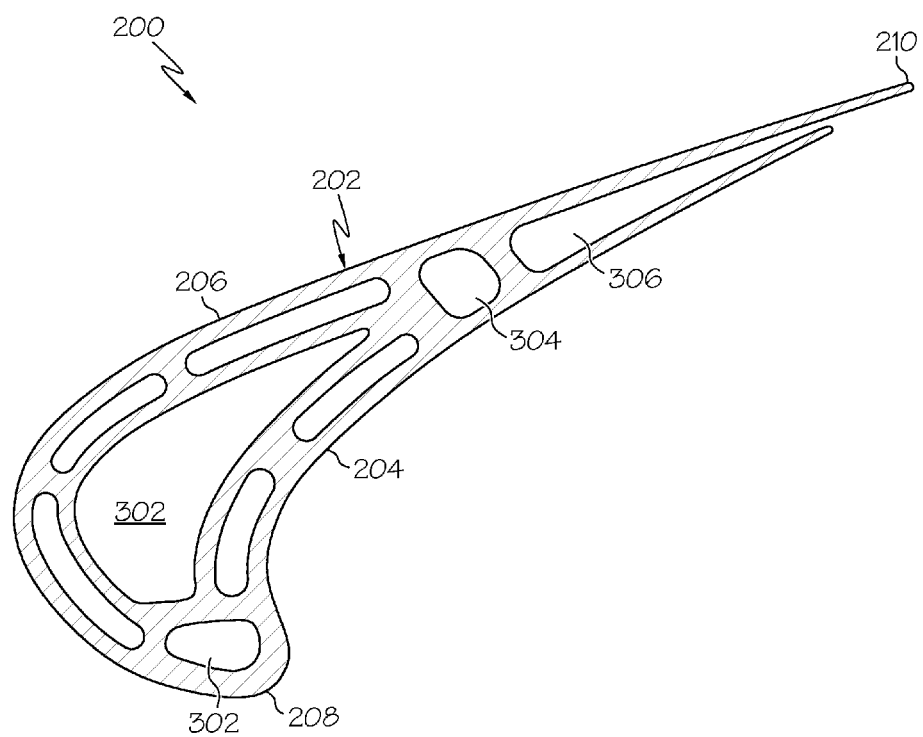
FIG. 4 is a second partial cross-sectional view of the turbine component of FIG. 2 in accordance with an exemplary embodiment.

FIG. 4 is a second partial cross-sectional view of the turbine component 200 of FIG. 2 in accordance with an exemplary embodiment. Particularly, FIG. 4 illustrates a generally axial cross-sectional view of the airfoil 202 of FIG. 2. As previously noted, the airfoil 202 extends from the leading edge 208 to the trailing edge 210 and from the pressure side 204 to the suction side 206. As also previously discussed, the airfoil 202 defines a number of cooling passages 302, 304, and 306, including the forward cooling circuit 302, the tip cooling circuit 304, and the trailing edge cooling circuit 306.

During use, the turbine components of FIG. 1, such as the turbine component 200 shown in FIGS. 2-4, may experience damage or distress. For example, the tip 212 (FIG. 2) or the flow discouragers 218 and 220 (FIG. 2) may be subject to deterioration due to oxidation or thermo-mechanical fatigue distress. Other areas that may be subject to distress include the discouragers of the stator vanes 120 (FIG. 1), shroud flanges 122 (FIG. 1), and areas at which the airfoil or stator vane are fixed, such as the airfoil root 214 (FIG. 2). In other embodiments, more complex turbine components, such as integral components with two or more airfoils may be repaired.

Figure 5:
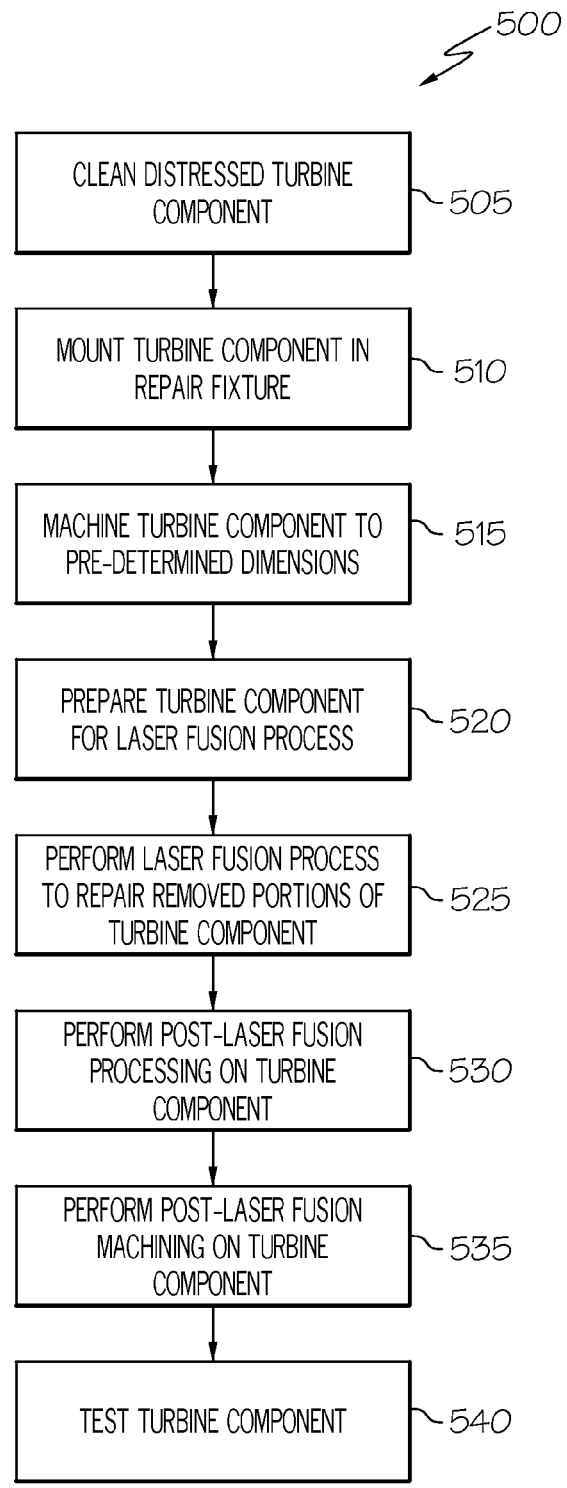
FIG. 5 is a flowchart of a method for repairing the turbine component of FIG. 2 in accordance with an exemplary embodiment.

FIG. 5 is a flowchart of a method 500 for repairing a turbine component, such as the turbine component 200 of FIG. 2, in accordance with an exemplary embodiment. The method 500 refers to the repair of an airfoil tip, such as tip 212 (FIG. 2), although any turbine component may be repaired according to the exemplary embodiments of method 500 discussed below. The method 500 includes a number of intermediate stages during repair of the turbine component, illustrated in the FIGS. 6-10, prior to completion of a finished turbine component, such as that shown in FIG. 2-4 discussed above.

In a first step 505, the turbine component to be repaired is cleaned to remove any coatings or layers prior to repair. For example, thermal barrier coatings (TBC) may be removed.

Figure 6:
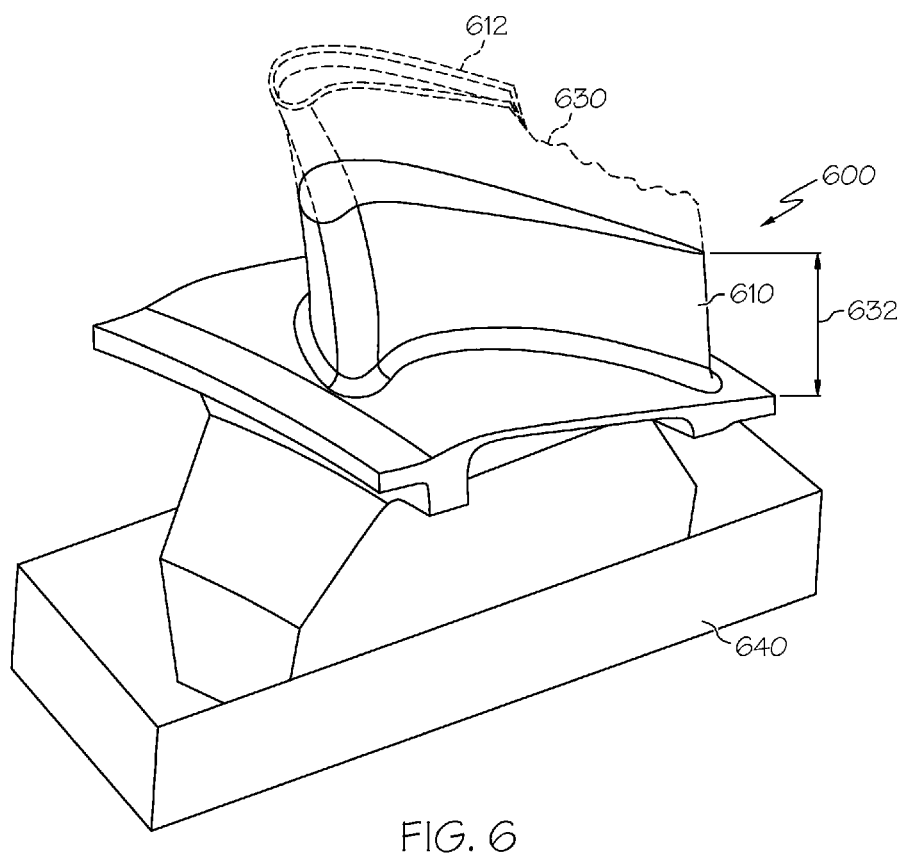
FIG. 6 is an isometric view a turbine component undergoing repair according to the method of FIG. 5 in accordance with an exemplary embodiment.

The description of steps 510-520 additionally refer to FIG. 6, which is an isometric view a turbine component 600 undergoing repair. As shown, the turbine component 600 generally corresponds to the turbine component 200 of FIGS. 2-4. After step 505, the turbine component 600 appears as shown in the dashed outline and includes a distressed portion 630 at the trailing edge 610 of the tip 612. As noted above, the distressed portion 630 may be a result of oxidation and/or thermo-mechanical fatigue and, if unattended, may inhibit the performance of the turbine component 600 during operation.

In a second step 510, the turbine component 600 is mounted into a repair fixture 640. Particularly, the repair fixture 640 may provide a known orientation and frame of reference for later processing. The turbine component 600 is positioned in a fixed orientation with respect to the repair fixture 640, which will be utilized in subsequent step 515 to machine the component in preparation for repair. This same repair fixture 640 is then utilized to precisely locate the turbine component 600 in the direct laser metal fusion repair system 700, shown in FIG. 7 and discussed below. This enables precise locating of the turbine component 600 for the desired repair.

In a third step 515, the turbine component 600 is machined to remove the distressed portion 630 of the turbine component 600 and to result in a turbine component (or intermediate turbine article) 600 of known dimensions (or a first set of dimensions). For example, as shown in FIG. 6, the dashed portion of the turbine component 600 is removed. The removed portion includes the distressed portion 630 and any other material necessary to result in the turbine component 600 having known dimensions. For example, the turbine component 600 after step 515 has a predetermined height 632 from which the turbine component 600 subsequently may be rebuilt. The predetermined height 632 may be determined based on considerations such as the extent of the distressed portion 630, the structure of the interior cooling passages (e.g., cooling passages 302, 304, 306 of FIGS. 3 and 4), and uniformity or consistency with prior experience in the repair method 500.

In a fourth step 520, the turbine component 600 may be prepared for a laser fusion process. For example, the turbine component 600 may undergo grit blasting, nickel blasting, and further cleaning to remove debris and oxides from the repair surfaces.

In a fifth step 525, the turbine component 600 is subject to a direct metal laser fusion process to rebuild the turbine component, i.e., to rebuild the section of turbine component removed in step 515. In general, direct metal laser fusion is a laser-based rapid prototyping and tooling process by which complex parts and sections of those parts may be directly produced by precision melting and solidification of powdered metal into successive layers of larger structures, each layer corresponding to a cross-sectional layer of the 3D component. The direct metal laser fusion process is described with reference to FIG. 7 which is a schematic view of a direct metal laser fusion system 700 that repairs the turbine component 600 following step 520.

Initially, the direct metal laser fusion system 700 relies upon a design model that may be defined in any suitable manner. For example, the model may be designed with computer aided design (CAD) software. The model may include 3D numeric coordinates of the entire configuration of the component including both external and internal surfaces of an airfoil, platform and dovetail, as well as any internal channels and openings. In one exemplary embodiment, the model may include a number of successive 2D cross-sectional slices that together form the 3D component. Particularly, such a model includes the successive 2D cross-sectional slices corresponding to the turbine component 600 from the machined height of step 515.

Figure 7:
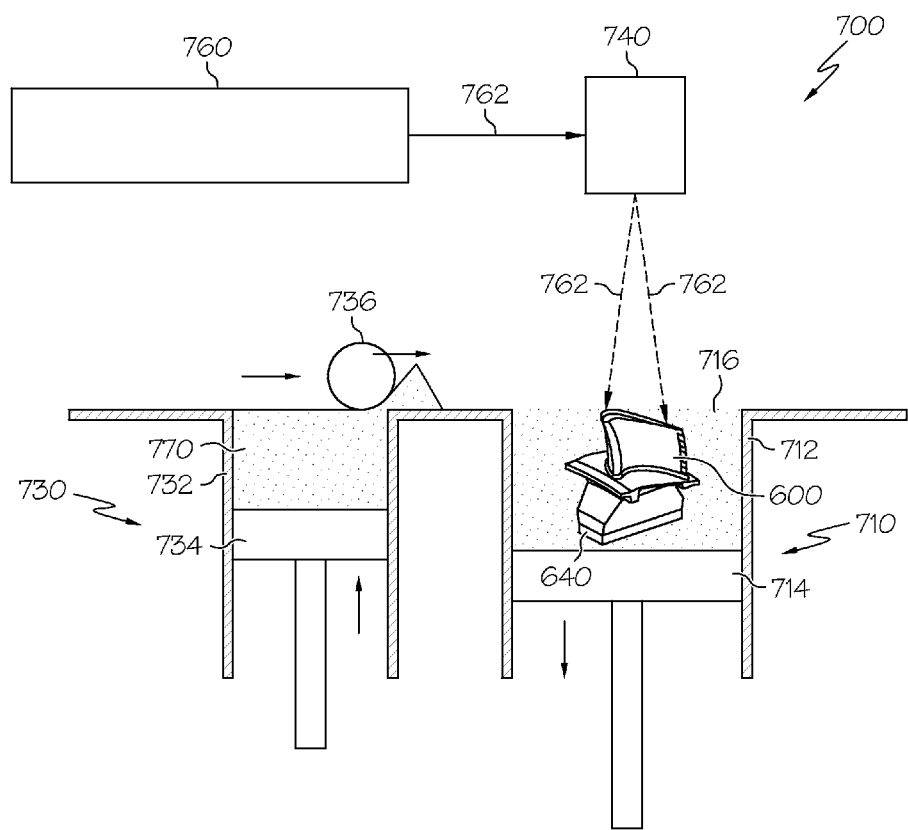
FIG. 7 is a system for repairing the turbine component of FIG. 6 according to the method of FIG. 5 in accordance with an exemplary embodiment.

The system 700 of FIG. 7 includes a fabrication device 710, a powder delivery device 730, a scanner 740, and a laser 760 that function to repair the turbine component 600 with build material 770. The fabrication device 710 includes a build container 712 with a fabrication support 714 carrying the turbine component 600 in the repair fixture 640 discussed above. The fabrication support 714 is movable within the build container 712 in a vertical direction and is adjusted in such a way to define a working plane 716. The delivery device 730 includes a powder chamber 732 with a delivery support 734 that supports the build material 770 and is also movable in the vertical direction. The delivery device 730 further includes a roller or wiper 736 that transfers build material 770 from the delivery device 730 to the fabrication device 710.

During operation, the fabrication support 714 is lowered and the delivery support 734 is raised. The roller or wiper 736 scrapes or otherwise pushes a portion of the build material 770 from the delivery device 730 to form the working plane 716 in the fabrication device 710. The laser 760 emits a laser beam 762, which is directed by the scanner 740 onto the build material 770 in the working plane 716 to selectively fuse the build material 770 into a cross-sectional layer of the turbine component 600 according to the design. More specifically, the speed, position, and other operating parameters of the laser beam 762 are controlled to selectively fuse the powder of the build material 770 into larger structures by rapidly melting the powder particles that may melt or diffuse into the solid structure below. As the scanned laser beam 762 moves on, heat is conducted away from the previously melted area, thereby leading to rapid cooling and resolidification. As such, based on the control of the laser beam 762, each layer of build material 770 will include unfused and fused build material 770 that respectively corresponds to the cross-sectional passages and walls that form the turbine component 600. In general, the laser beam 762 is relatively low power to selectively fuse the individual layer of build material 770. As an example, the laser beam 762 may have a power of approximately 50 to 500 Watts, although any suitable power may be provided.

Upon completion of a respective layer, the fabrication support 714 is lowered and the delivery support 734 is raised. Typically, the fabrication support 714, and thus the turbine component 600, does not move in a horizontal plane during this step. The roller or wiper 736 again pushes a portion of the build material 770 from the delivery device 730 to form an additional layer of build material 770 on the working plane 716 of the fabrication device 710. The laser beam 762 is again controlled to selectively form another cross-sectional layer of the turbine component 600. This process is continued according to the modeled design as successive cross-sectional layers are built into the repaired turbine component 600. As such, the turbine component 600 is positioned in a bed of build material 770 as the successive layers are formed such that the unfused and fused material supports subsequent layers. In one exemplary embodiment, the repair fixture 640 may support the bed of deposited build material 770. The localized fusing of the build material 770 enables more precise placement of fused material to reduce or eliminate the occurrence of over-deposition of material and excessive energy or heat, which may otherwise result in cracking or distortion. The unused and unfused build material 770 may be reused, thereby further reducing scrap.

In the system 700 of FIG. 7, the laser 760 is movably supported relative to the turbine component 600 for selectively fusing the metal. The additional build material 770 is provided by the roller 736 in a constant manner. As such, the delivery of build material 770 and movement of the turbine component 600 in the vertical direction are relatively constant and only the movement of the laser beam 762 must be selectively controlled to provide a simpler and more precise implementation.

Any suitable laser and laser parameters may be used, including considerations with respect to power, laser beam spot size, and scanning velocity. The build material 770 may be formed by any suitable powder, including powdered metals, such as a stainless steel powder, and alloys and super alloy materials, such as nickel-based or cobalt superalloys. In one exemplary embodiment, the build material 770 is a high temperature nickel base super alloy such as MAR-M-247. In other embodiments, IN718 or IN738 or other suitable alloys may be employed. The powder build material 770 may be selected for enhanced strength, durability, and useful life, particularly at high temperatures. Each successive layer may be, for example, between 10 µm and 200 µm, although the thickness may be selected based on any number of parameters.

As noted above, the turbine component 600 includes cooling passages (e.g., cooling passages 302, 304, and 306) that deliver a cooling flow to the finished turbine component 600. The cooling passages may be relatively complex and intricate for tailoring the use of the limited pressurized cooling air and maximizing the cooling effectiveness thereof and the overall engine efficiency. However, the successive, additive nature of the laser fusion process enables the construction of these passages. Particularly, the cooling passages have relatively thin walls that will not hold up to many conventional repair techniques. However, the relatively low amount of energy used by the laser fusion process enhances the ability to form such walls without loss of integrity or blockage of the cooling passages. Overall, as compared to conventional repair techniques, less energy is required and less scrap is generated. If necessary or desired, ceramic filler may be inserted into and support the cooling passages during preparatory step 520 prior to performing the laser fusion repair process 525. The cooling wall thicknesses can be in the range of 0.25 mm to 1 mm at the thinnest sections. Some conventional techniques, which utilize higher heat loads at the repair surface, may result in buckling and distortion of the intricate cooling passages below the repair surface at these thicknesses. A thermally set or catalytically cured ceramic filler may be injected into the cooling passages prior to component repair to ensure that the cooling cavity features are maintained during the repair procedure. The ceramic filler may comprise alumina or silica ceramic powder in a binder that may be injected into the cooling passages. After component repair, the ceramic filler is removed from the cooling passages using conventional ceramic core removal techniques for cast metallic turbine components.

Although the direct metal laser fusion system 700 is shown, other rapid prototyping or additive layer manufacturing processes may be used in step 525 of method 500, including micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; direct metal laser sintering; and direct metal deposition. In general, additive repair techniques provide flexibility in free-form fabrication and repair without geometric constraints, fast material processing time, and innovative joining techniques.

When the laser fusion process has rebuilt the turbine component into the completed component (or to a second set of dimensions), the unfused build material 770 is removed and the turbine component 600 is removed from the fabrication device 710 in anticipation of the subsequent steps of the repair method 500 discussed below.

Figure 8:
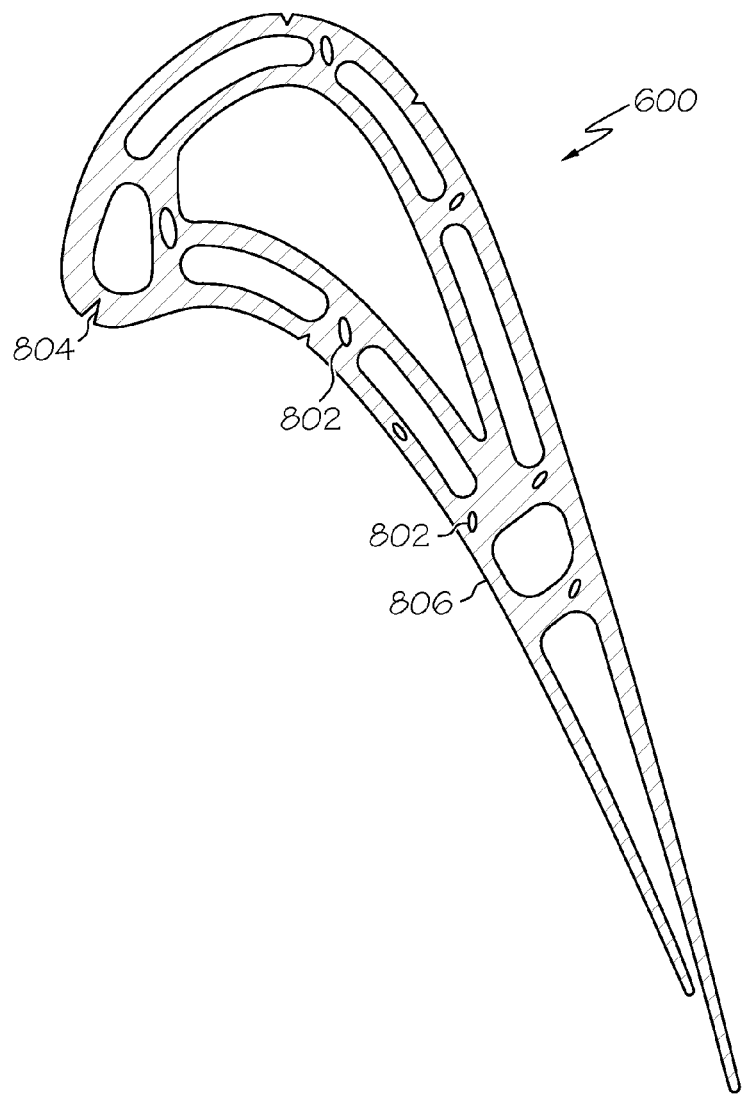
FIG. 8 is a cross-sectional view of the turbine component of FIG. 6 undergoing repair according to the method of FIG. 5 in accordance with an exemplary embodiment.
Figure 9:
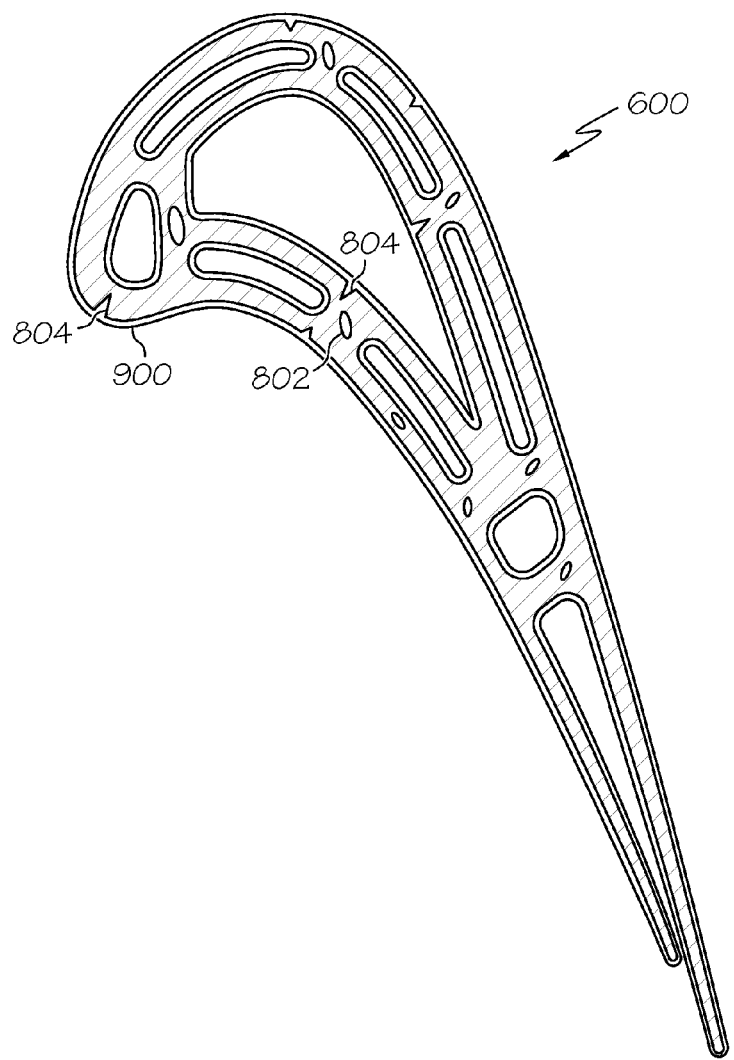
FIG. 9 is another cross-sectional view of the turbine component of FIG. 6 undergoing repair according to the method of FIG. 5 in accordance with an exemplary embodiment.
Figure 10:
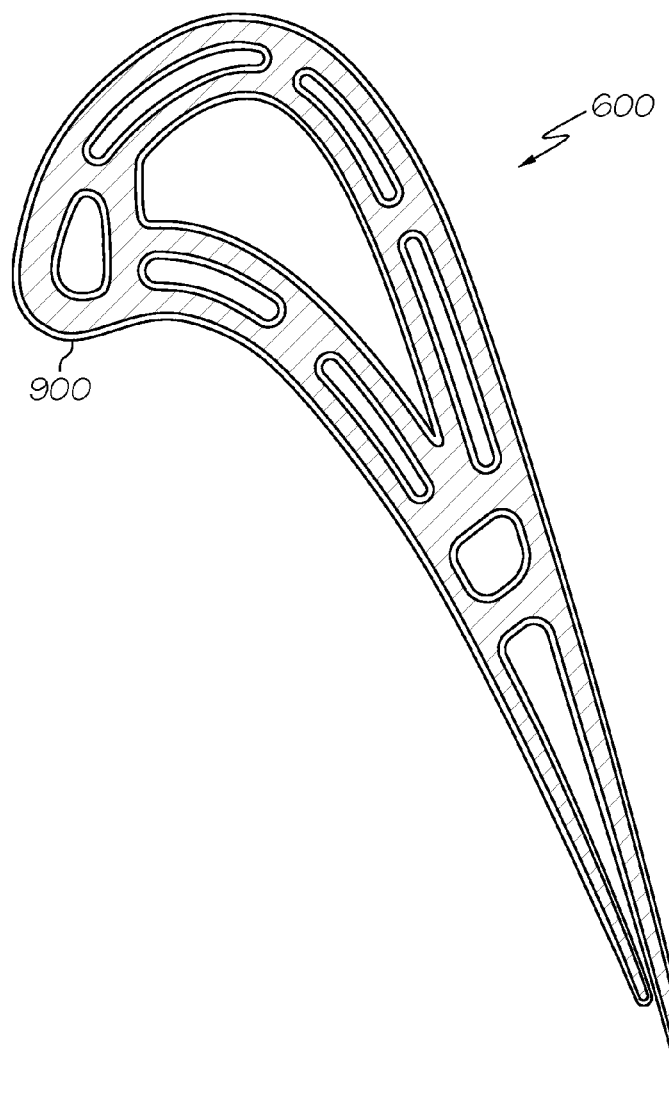
FIG. 10 is further cross-sectional view of the turbine component of FIG. 6 undergoing repair according to the method of FIG. 5 in accordance with an exemplary embodiment.

Returning briefly to FIG. 5, upon completion of laser fusion step 525, the method 500 continues to step 530 in which post-laser fusion processing may be performed on the turbine component 600. Such processing may include, for example, stress relief heat treatments, peening, polishing, hot isostatic pressing (HIP), or coatings. In some embodiments, one or more of the post-laser fusion processing steps (e.g., step 530) discussed below are not necessary and may be omitted. One example of a post-laser fusion process of step 530 is discussed below with reference to FIGS. 8-10. FIGS. 8-10 are successive cross-sectional views of the step 530 applied to the turbine component 600 discussed above.

Referring initially to FIG. 8, after the direct metal laser fusion process in step 525 (FIG. 5), the turbine component 600 may include both internal porosity and cracks 802 and surface porosity and cracks (or surface connected defects) 804 within the solidified substrate 806. The term "porosity" used herein refers to a defect that comprises small spaces or voids within the solidified substrate 806. The term "cracks" used herein refers to linear defects or voids within the solidified substrate 806, for example, with an aspect ratio greater than three to one.

Referring now to FIG. 9, the turbine component 600 of FIG. 8 is shown encapsulated with an encapsulation layer 900. As noted above, the additive manufacturing techniques used in step 525 may result in internal porosity and cracks 802 and surface porosity and cracks 804 in the substrate 806. The encapsulation layer 900 functions to effectively convert any surface porosity and cracks into internal porosity and cracks. For example, the surface porosity and cracks 804 of FIG. 8 are effectively internal porosity and cracks in FIG. 9 as a result of the encapsulation layer 900. Any suitable encapsulation process may be provided that bridges and covers the porosity and cracks 804 in the surface of the substrate 806. For example, the encapsulation layer 900 may have a thickness of approximately 10-100 μm, although any suitable thickness may be provided. In one exemplary embodiment, the encapsulation layer 900 may be a metal or alloy that is compatible with the substrate 806 and may be applied by a plating or coating process, as described below.

In various exemplary embodiments, the encapsulation layer 900 may be formed, for example, by electroless plating or electroplating processes. For example, electroless nickel plating is a chemical reduction process that uses a catalytic reduction process of nickel ions in an aqueous solution containing a chemical reducing agent and the subsequent deposition of nickel metal without the use of electrical energy. The reducing agent may be, for example, boron, and the boron may undergo solid state diffusion away from the surface to minimize suppression of the melting point and to enable subsequent oxidation coatings such as Pt—Al or simple aluminide. Additionally, electroless nickel may not require electrical contact points such that bare spots can be eliminated by movement of fixture contact points. In another example, a nickel electroplating process uses the receiving component as a cathode and an application component as an anode submerged in a solution of electrolyte containing dissolved metal salts, for example in a chloride based bath. The anode and cathode are connected to an external power source of direct current. This results in the transfer of the nickel coating from the solution to the component. In either process, uniform thicknesses and concentrations may be achieved. Electrodeposit thickness uniformity may be improved with the use of conforming anodes, and any bare spots created at electrical contact points may be reduced by alternating the location of the contact point during the plating process. In further embodiments, the encapsulation layer 900 may include cobalt plating, sol-gel chemical deposition techniques, aluminide coating, or low pressure plasma sprays.

Referring now to FIG. 10, the turbine component 600 may be consolidated, such as in a hot isostatic pressing (HIP) process in which the turbine component 600 is subjected to elevated temperatures and pressures over time. The HIP process may be performed at any temperature, pressure, and time that are suitable for forming a compacted solid having negligible porosity. In one embodiment, the HIP process may be performed at a processing temperature in a range of about 1000° C. to about 1300° C. and may be performed at a pressure in a range of about 1 ksi to about 25 ksi for a time period of about 1 to about 10 hours. In other embodiments, the HIP processing temperature, pressure, and time may be smaller or larger.

In general, the HIP process will not reduce defects such as porosity or cracks that are connected to the surface of the component. As such, the encapsulation layer 900 provided in FIG. 9 functions to internalize any such surface connected defects (e.g., surface connected porosity and cracks) such that the HIP process is effective for all or substantially all of the cracks or porosity in the substrate 806, including cracks and porosity that would otherwise be external, such as surface porosity and cracks 804 in FIG. 8. The reduction in defects, such as porosity and cracks, resulting from the HIP process, as illustrated in FIG. 10, yields improved overall mechanical properties, including tensile and stress rupture strengths.

As noted above, additional processing treatments may be provided for the turbine component 600, including additional heat, aging, annealing, quenching, or surface treatments. One exemplary finishing treatment includes removal of the encapsulation layer 900 of FIG. 10. In some exemplary embodiments, no such finishing treatments are necessary. For example, the encapsulation layer 900 may remain on the finished turbine component 600 and provide oxidation protection.

Returning again to FIG. 5, upon completion of the step 530, the method 500 may proceed to step 535 in which the turbine component 600 is machined to the final specifications. The machining techniques may include, for example, the addition of a tip cap, formation of cooling holes, and grinding the rotor tips. At this point, the turbine component 600 corresponds to the completed turbine component 200 shown in FIGS. 2-4.

In step 540, the turbine component 600 is tested. For example, the turbine component 600 may be tested with water and air flow to verify the acceptability of the cooling circuit. Subsequent to any finishing steps, the turbine component 600 may be installed in a turbine section of a gas turbine engine, as shown in FIG. 1.

Figure 11:
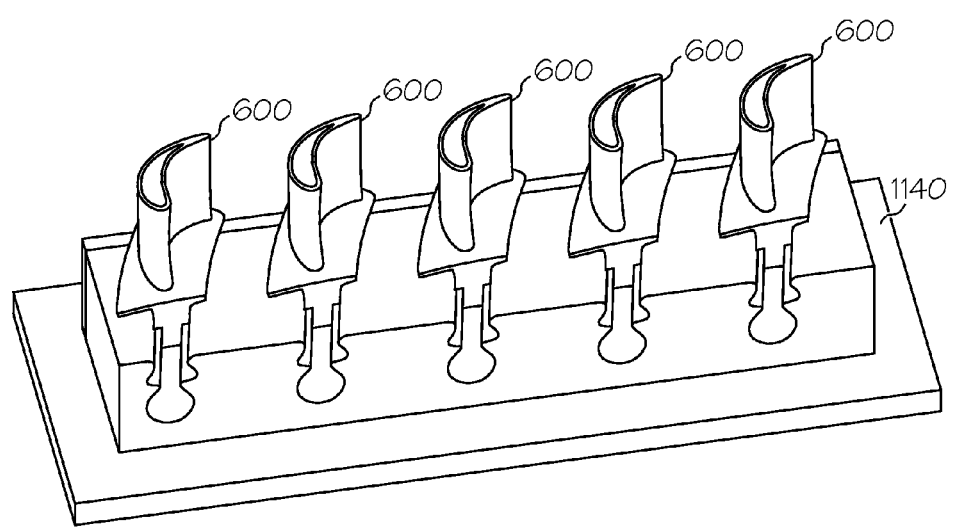
FIG. 11 is an isometric view of a repair fixture for repairing multiple turbine components according to the method of FIG. 5.

The method 500 has been discussed above with reference to the repair of a single turbine component 600. However, in one exemplary embodiment of the method 500, more than one turbine component 600 may be repaired simultaneously. For example, FIG. 11 is an isometric view of a repair fixture 1140 to repair multiple turbine components 600. Unless otherwise noted, method 500 in this embodiment proceeds as discussed above. In this embodiment of the method 500, the turbine components 600 are mounted in the common repair fixture 1140 to provide a common orientation and a known point of reference. Each turbine component 600 is machined down to a common height or other dimension in step 515. As such, each of the turbine components 600 to be repaired is generally identical to one another after step 515, even though the extent of distress on each turbine component 600 may be different. For example, the turbine component 600 with the greatest amount of distress (i.e., the greatest amount to remove) may dictate the amount of machining for all of the turbine components 600. This enables all of the turbine components 600 to be normalized to a baseline so that further individual processing is not necessary. During step 525, the successive layers can be formed for the group of turbine components 600 simultaneously according to a common module or design. For example, as in FIG. 7, the powdered metal may be deposited across a single working plane and one or more lasers may selectively fuse the layers of each turbine component 600, either sequentially or simultaneously. The turbine components 600 may then be lowered together for the formation of the next layer. Simultaneous repair may minimize cost and variability of the repair process.

Accordingly, exemplary embodiments may enable repair of turbine components that may be capable of withstanding higher temperatures and stresses, thereby leading to further improvements in engine performance. As noted above, both cooled and uncooled components may be repaired. Exemplary embodiments discussed herein provide rapid prototyping to reduce costs and cycle time in the engine repair, and the ability to satisfactorily repair engine components instead of replacement realizes a significant savings. Exemplary embodiments are applicable to both commercial and military gas turbine engines and auxiliary power units, including industrial applications such as electricity generation, naval propulsion, pumping sets for gas and oil transmission, aircraft and/or spacecraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method for repairing a turbine component with a distressed portion, comprising the steps of:
    machining the turbine component into a first intermediate turbine article such that the distressed portion is removed; and
    rebuilding the first intermediate turbine article into the turbine component with an additive manufacturing process, wherein the turbine component includes internal passages, and wherein the rebuilding step includes rebuilding at least some of the internal passages with the additive manufacturing process;
    encapsulating the turbine component with an encapsulation layer, wherein the encapsulating step includes encapsulating within the internal passages;
    consolidating the turbine component and the encapsulation layer, wherein the encapsulating step includes converting surface connected defects to internal defects prior to the consolidating step, and wherein the consolidating step includes hot isostatic pressing; and
    removing the encapsulation layer after the machining, rebuilding, encapsulating, and consolidating steps.

2. The method of claim 1, wherein the machining step includes machining the turbine component to predetermined dimensions.

3. The method of claim 1, wherein the rebuilding step includes direct metal laser fusing a powdered metal onto the first intermediate turbine article.

4. The method of claim 3, wherein the rebuilding step includes:
    defining a three-dimensional model of the turbine component; and
    converting the three-dimensional model to a plurality of slices that each define a cross-sectional layer of the turbine component.

5. The method of claim 4, wherein the fusing step includes melting the powdered metal to form the turbine component in successive layers according to the three-dimensional model.

6. The method of claim 5, wherein the melting step includes melting the powdered metal with a laser beam having a power of approximately 50 to 500 Watts.

7. The method of claim 3, wherein the rebuilding step includes positioning the first intermediate turbine article into a bed of the powdered metal.

8. The method of claim 3, wherein the rebuilding step includes depositing a layer of the powdered metal onto the first intermediate turbine article with a roller or wiper.

9. The method of claim 1, wherein the rebuilding step includes metallic additive manufacturing using a high energy density beam, the high energy density beam including at least one of laser beam, electron beam, plasma jet, or electric arc.

10. The method of claim 1, wherein the rebuilding step includes direct metal laser fusing a powdered Nickel-based superalloy onto the first intermediate turbine article.

11. The method of claim 1, wherein the rebuilding step includes rebuilding the internal passages with walls having a thickness of 0.25 mm to 1 mm.

12. The method of claim 1, wherein the encapsulating step includes encapsulating the turbine component with the encapsulation layer having a thickness of approximately 10 µm to approximately 100 µm.

* * * * *